US006813916B2

(12) United States Patent
Chang

(10) Patent No.: US 6,813,916 B2
(45) Date of Patent: Nov. 9, 2004

(54) REMOTE CONTROL LOCK STRUCTURE

(76) Inventor: Ching-Wen Chang, 10F, No. 371, Chung Shan Rd., Sec. 2, Pan Chiao City, Taipei Hsien (TW)

( * ) Notice: Subject to any disclaimer, the term of this patent is extended or adjusted under 35 U.S.C. 154(b) by 0 days.

(21) Appl. No.: 10/291,475

(22) Filed: Nov. 12, 2002

(65) Prior Publication Data

US 2004/0089037 A1 May 13, 2004

(51) Int. Cl.[7] ................................................ B60R 25/04

(52) U.S. Cl. .......................... 70/257; 70/277; 70/278.1; 70/416; 292/144

(58) Field of Search .......................... 70/256, 257, 275, 70/277, 278.1, 280–282, 416; 292/144

(56) References Cited

U.S. PATENT DOCUMENTS

| | | | | | |
|---|---|---|---|---|---|
| 4,633,688 | A | * | 1/1987 | Beudat et al. | 70/280 X |
| 4,670,746 | A | * | 6/1987 | Tanigucji et al. | 70/257 X |
| 4,962,676 | A | * | 10/1990 | Vainstock | 74/479 |
| 4,986,099 | A | * | 1/1991 | Johnson et al. | 70/277 |
| 5,246,258 | A | * | 9/1993 | Kerschenbaum et al. | 292/144 |
| 5,321,963 | A | * | 6/1994 | Goldman | 70/278 |
| 5,473,922 | A | * | 12/1995 | Bair et al. | 70/416 |
| 5,480,198 | A | * | 1/1996 | Wydler et al. | 292/144 |
| 5,531,086 | A | * | 7/1996 | Bryant | 70/280 X |
| 5,546,777 | A | * | 8/1996 | Liu et al. | 70/257 |
| 5,680,119 | A | * | 10/1997 | Magliari et al. | 70/257 X |
| 5,686,899 | A | * | 11/1997 | Hosmer | 70/278 X |
| 5,852,944 | A | * | 12/1998 | Collard, Jr. et al. | 70/278 |
| 5,862,693 | A | * | 1/1999 | Myers et al. | 70/278 |
| 5,987,818 | A | * | 11/1999 | Dabideen | 292/144 X |
| 6,035,676 | A | * | 3/2000 | Hudspeth | 70/278.1 |
| 6,098,433 | A | * | 8/2000 | Maniaci | 70/278.1 |
| 6,119,538 | A | * | 9/2000 | Chang | 292/144 X |
| 6,212,923 | B1 | * | 4/2001 | Clark | 70/416 |
| 6,411,195 | B1 | * | 6/2002 | Goldman | 70/278.1 X |
| 6,585,302 | B2 | * | 7/2003 | Lin | 70/257 X |
| 6,591,643 | B1 | * | 7/2003 | Cannella et al. | 70/277 |
| 6,601,418 | B2 | * | 8/2003 | Huang | 70/280 |
| 6,609,736 | B2 | * | 8/2003 | Yeh | 292/144 |
| 6,619,085 | B1 | * | 9/2003 | Hsieh | 70/257 |
| 2002/0125724 | A1 | * | 9/2002 | Doong | 292/144 |

* cited by examiner

*Primary Examiner*—Suzanne Dino Barrett
(74) *Attorney, Agent, or Firm*—Bacon & Thomas, PLLC

(57) ABSTRACT

A remote control lock structure. The lock structure includes a receiving box, a locking member, a transmission mechanism, an electric circuit element and a cover. The locking member is placed in the receiving space aligned with a screw hole of a positioning block with a round hole on the receiving box. An axle rod is extended into and out of the round hole, and one end of the axle rod is connected to a main gearing wheel of the transmission mechanism. The main gearing wheel is connected at its lateral sides with the two power transmission wheels, and two power motors are connected with the electric circuit element which provides electric power to activate one of the power motors, thereby one of the two power transmission wheels and the main gearing wheel are driven to rotate. The axle rod further drives the locking rod to rotate to make the latching rod on the front end of the locking rod extend out and retract in between the screw hole and the round hole.

6 Claims, 5 Drawing Sheets

REMOTE CONTROL LOCK STRUCTURE

BACKGROUND OF THE INVENTION

1. Field of the Invention

The present invention is related to a remote control lock structure; and especially to a remote control lock structure of which all transmitting members are received in a receiving box and are covered with a cover to keep covertness of the lock structure, in which by providing two motors, the life of use in the transmitting operation can be doubled; and in which by providing in a control electric circuit a sounding device and a lamp flashing device to provide the function of theft-proofing, and by fixedly mounting the lock structure at a mutual juxtaposed position of a door panel and a door frame to form a concealed lock which is not easy to be discovered nor is easy to be destroyed. This is an excellent inventive remote control lock structure.

2. Description of the Prior Art

Any of various provisions with a door panel such as a room door, a car door, a storage bin door panel, a cabinet door panel, a door panel of a safe or a safety box etc. may be provided with a lock to prevent theft or destruction of persons having nothing to do with them. While the numerous kinds of locks used presently mostly are exposed to the outside of door panels or hung on the door panels, such locks are subjected to destruction by externally applied forces; they are manifest objects to allow easy destruction by thieves to make serious losses. Most lock manufacturers want to increase the theft-proof functions of locks, they study, improve hardly to increase the structural effects of the locks. However, the locks are still exposed to the outside of door panels and still are subjected to being destroyed by thieves, theft is so hard to forbid.

There have been locks with remote control latches developed by some manufacturers, in which they fix a base on a door panel to form a positioning seat with through holes on the two lateral sides thereof; the base is provided thereon with a retarding motor which has a rotating disc on the front end thereof, the rotating disc has on the external surface thereof a threaded recess, a latch is positioned in the through holes of the positioning seat on the base by mutual engagement of the threaded recess and a screw thread provided at the middle portion of the latch; and the retarding motor is connected with a remote control receiver, an electric circuit board and a power source. By forward rotation and inversed rotation of the motor by a remote control way, the rotating disc is rotated and in turn moves the latch to extend out or retract; thereby the object of remote control is achieved.

However, the base of such a remote control latch is opened, the motor, latch, rotating disc, circuit board and electric wires etc. are all exposed to the outside of the door panel without providing a safety provision, it is quite easy to be destroyed by an external force, and is subjected to contamination of dust and fine materials; thereby, the operating function of the remote control lock is subjected to being influenced, and the life of use too. The lock only is suitable to be mounted on the inner side of the door panel, the scope of use of it is limited; and the lock is not suitable to be mounted on a safe or a safety box, a storage bin and a cabinet etc. whereon the remote control lock will be easily destroyed by an external force.

SUMMARY OF THE INVENTION

In view of the fact that locks are tools for locking various door panels, its main function is to prevent thieves from destroying the locks for stealing, while the locks used presently are all exposed to the outside of the door panel, they are quite easy to be seen and destroyed by external forces, and thereby the effect of theft-proofing is largely reduced, improvement is looked forward to.

The inventor of the present invention successfully provides this remote control lock structure based on his professional experience of years in designing, vending and manufacturing same kind of products and after hard study, improving, developing, as well as repeated experiments and tests. In which all transmitting members are mounted in a receiving box and are covered with a cover in order to make the lock totally concealed, the lock can be fixedly mounted at a mutual juxtaposed position of the door panel and the door frame of a door to form a concealed lock which is not easy to be discovered nor is easy to be destroyed.

The primary object of the present invention is to provide a remote control lock structure mainly comprised of a receiving box, a locking member, a transmission mechanism, an electric circuit element and a cover etc. The receiving box has therein a receiving space, and is provided on a lateral wall thereof with a round hole, the locking member, transmitting mechanism and electric circuit element etc. are placed in the receiving space, and the cover covers the receiving box. The receiving box can then be mounted on a door panel and a locking shaft can be reciprocated in the round hole for locking in the way of remote control.

The secondary object of the present invention is to embed the receiving box after covering in a lateral side of the door panel where the door panel is juxtaposed with the door frame, the remote control lock is hidden in the door panel to form a concealed lock which is not easy to be discovered nor is easy to be destroyed.

Another object of the present invention is to provide all the members of the remote control lock in the receiving box to avoid contaminant of dust, the members can be operated well, and the life of use of the remote control lock can be longer.

Another object of the present invention is to provide a sound-effect horn, an LED alarm lamp, a touch alarm device etc. to increase the function of theft-proofing and to prevent the lock from being destroyed.

The present invention will be apparent in the detailed structure and the way of use thereof after reading the detailed description of the preferred embodiments thereof in reference to the accompanying drawings.

DETAILED DESCRIPTION OF THE PREFERRED EMBODIMENT

Figure 1:
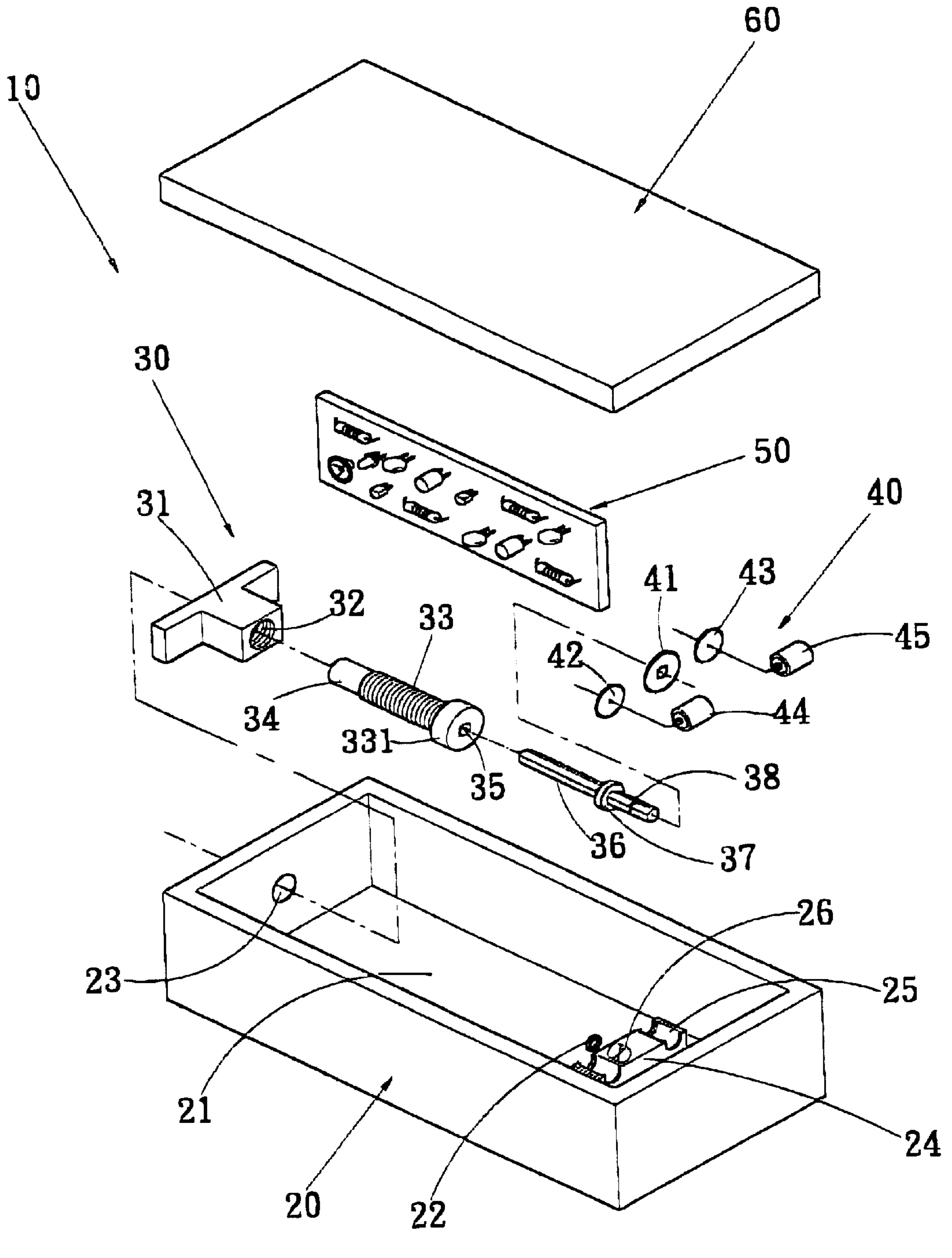
FIG. 1 is an analytical perspective view showing the structure of the present invention.
Figure 2:
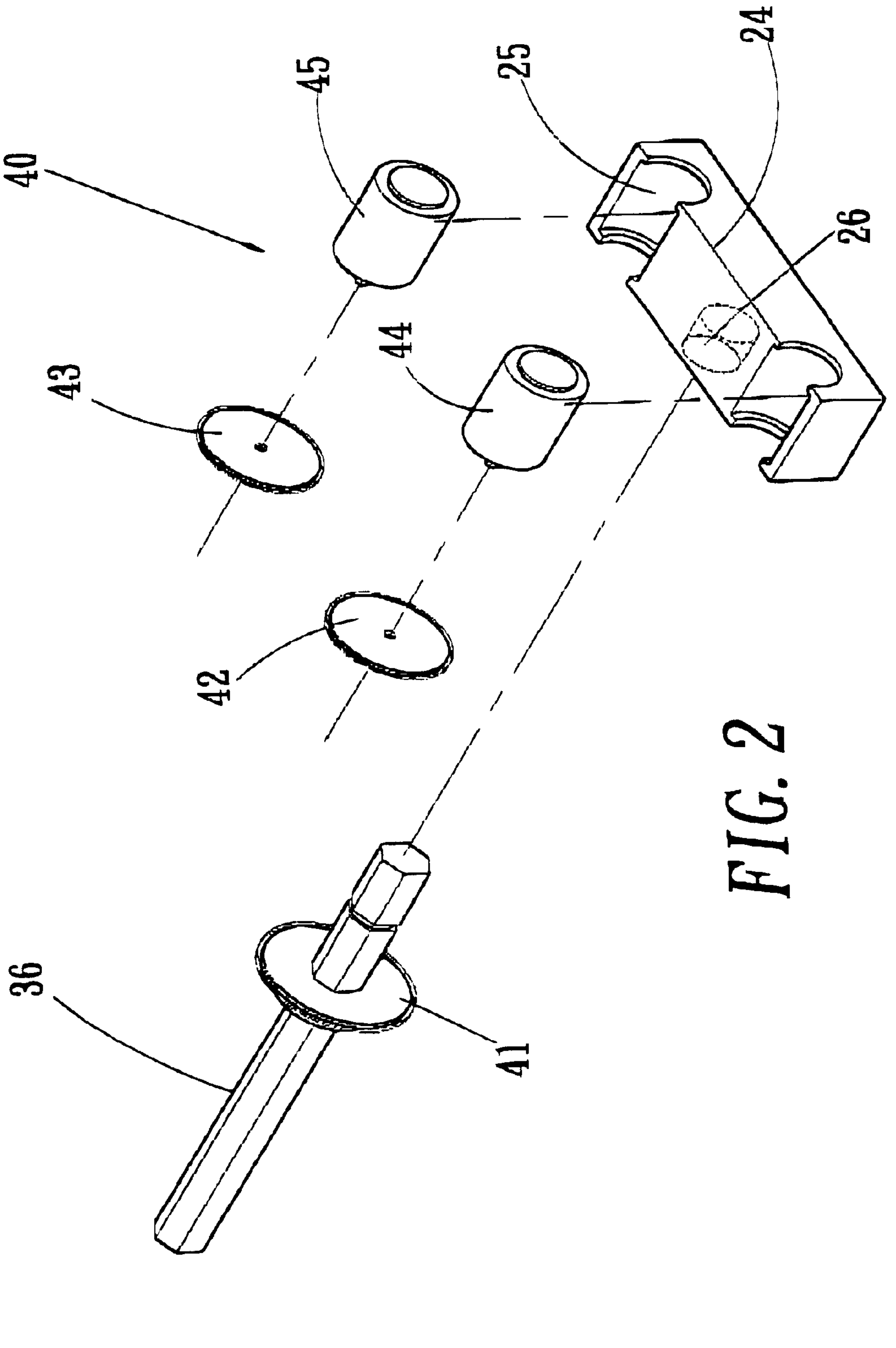
FIG. 2 is an analytical perspective view of the structure of a transmission mechanism and a positioning seat of the present invention.

Referring to FIGS. 1, 2, the remote control lock 10 of the present invention is comprised of a receiving box 20, a locking member 30, a transmission mechanism 40, an electric circuit element 50 and a cover 60 etc.

Wherein the receiving box 20 has therein a receiving space 21 to receive the abovementioned elements, the receiving space 21 is provided therein with a positioning ring 22, and is provided on one end thereof with a round hole 23; a positioning seat 24 is provided in the rear of the positioning ring 22 and is provided therein with receiving recesses 25, the positioning seat 24 is further provided on the front side thereof with a limiting hole 2; the receiving box 20 can be covered with a cover thereover.

The locking member 30 is provided in the receiving box 20, it includes a positioning block 31 which has therein a screw hole 32, the screw hole 32 can allow a locking rod 33 to screw therein, the locking rod 33 has a latching rod 34 on the front end thereof to extend out of the screw hole 32. The locking rod 33 is provided on one end thereof with a sensing piece 331 and an axial hole 35; the axial hole 35 is provided for extending of an axle rod 36 therein, the axle rod 36 is provided thereon with a stop block 37 and a recess 38 at one side of the stop block 37, the stop block 37 can limit the retracting distance of the locking rod 33.

The transmission mechanism 40 is connected to one end of the locking member 30 and is provided in the receiving box 20; the transmission mechanism 40 is provided thereon with a main gearing wheel 41, two power transmission wheels 42, 43 are provided at the two lateral sides of the main gearing wheel 41, the two power transmission wheels 42, 43 are both provided with a power motor 44 (45).

The electric circuit element 50 provides electric power for the power motors 44, 45 and is also provided in the receiving box 20, it has a function of receiving remote control signals (the circuit is a general remote control receiving circuit and thereby the circuit diagram is not shown); after receiving a signal, the electric power is transmitted to the power motors 44, 45 to make the power motors 44, 45 rotate forwardly or inversely.

Figure 3:
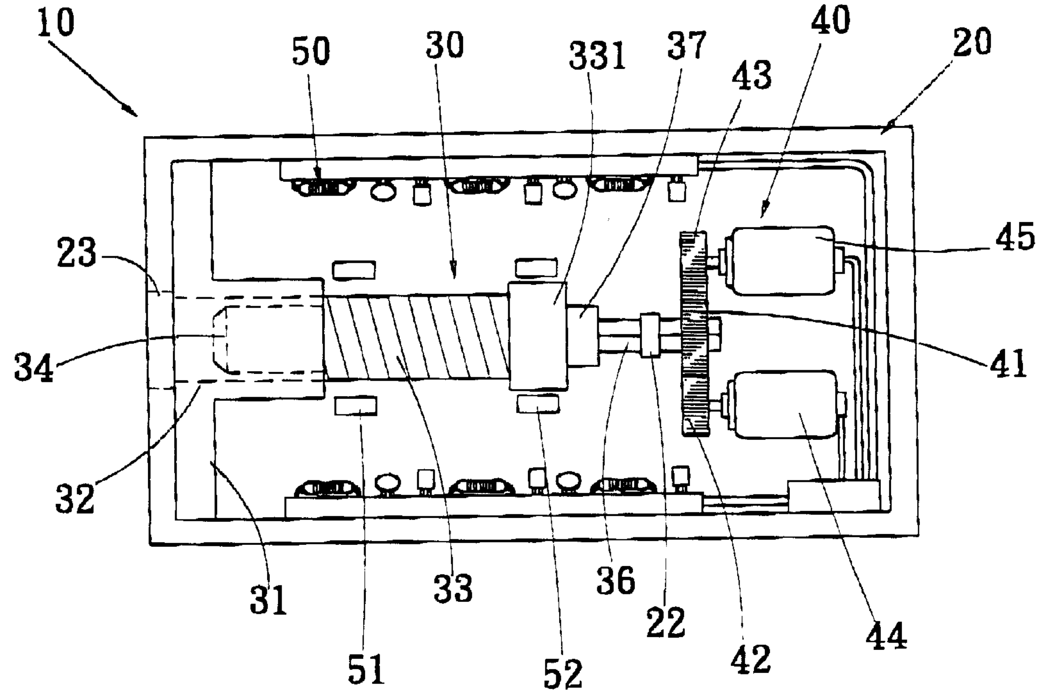
FIG. 3 is a sectional view showing the structure of the present invention.
Figure 4:
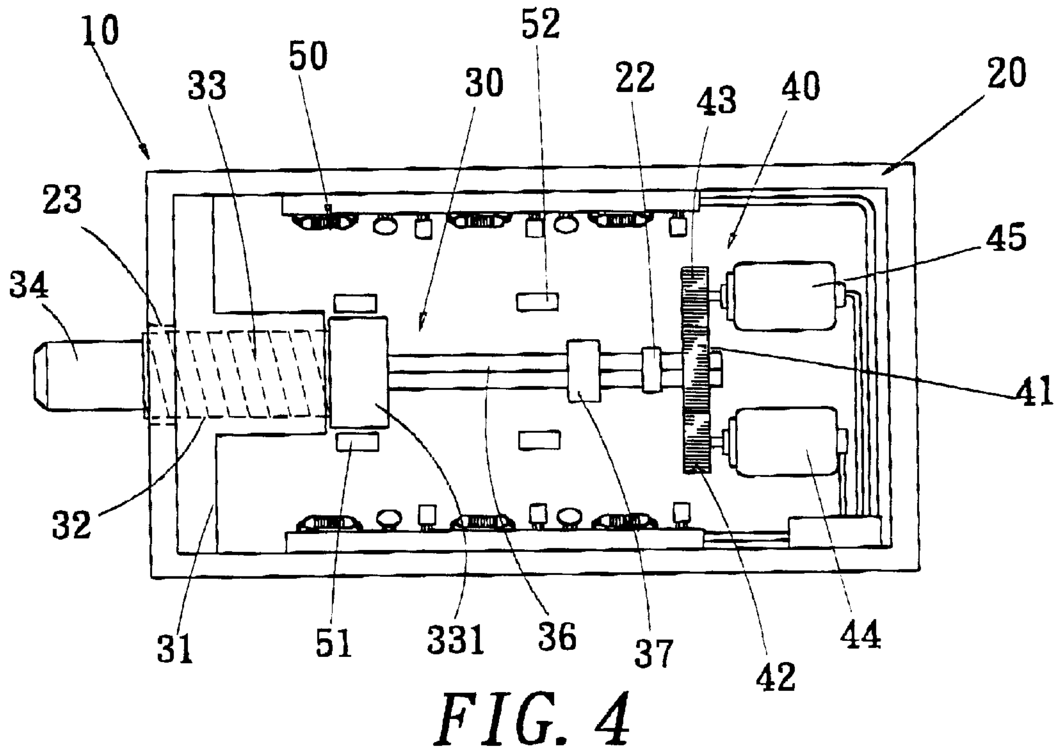
FIG. 4 is a schematic sectional view showing the structure and action of the present invention.

With the abovementioned members, the locking member 30 is placed in the receiving space 21 of the receiving box 20 (as shown in FIGS. 3, 4) to make alignment of the screw hole 32 of the positioning block 31 with the round hole 23; the recess 38 of the axle rod 36 on the locking member 30 is embedded therein with the positioning ring 22 of the receiving space 21, the axle rod 36 is connected on one end thereof into the main gearing wheel 41 of the transmission mechanism 40. The main gearing wheel 41 is further connected at the two lateral sides thereof with the two power transmission wheels 42, 43 and the power motors 44, 45; then one end of the axle rod 36 is inserted into a limiting hole 26 of the positioning seat 24. The power motors 44, 45 are respectively placed in the receiving recesses 25 of the positioning seat 24, and then the rear sides of the power motors 44, 45 are connected with the electric circuit element 50 which provides electric power to activate one of the power motors 44, 45, thereby one of the two power transmission wheels 42, 43 is driven (the other one is idling) to rotate, and the main gearing wheel 41 in turn is driven to rotate, the axle rod 36 pivotally connected with the main gearing wheel 41 is rotated therewith. The axle rod 36 further drives the locking rod 33 in front of it to rotate, the screw thread on the locking rod 33 is rotated in the screw hole 32, at the same time, it makes the latching rod 34 on the front end of the locking rod 33 extend out and retract in between the screw hole 32 and the round hole 23.

When the locking rod 33 is driven by the axle rod 36 to rotate forwards and to render the locking rod 33 to extend and move forwards, when the sensing piece 331 of the locking rod 33 is moved to the position in a front sensing device 51, the electric circuit element 50 activates the power motor 44 to operate; when the locking rod 33 is driven by the axle rod 36 to rotate rearwards and to render the locking rod 33 to move rearwards and retract, and when the sensing piece 331 of the locking rod 33 is moved to the position in a rear sensing device 52, the sensing piece 331 of the locking rod 33 abuts against the stop block 37 of the axle rod 36, and the electric circuit element 50 stops operation of the power motor 44.

Figure 5:
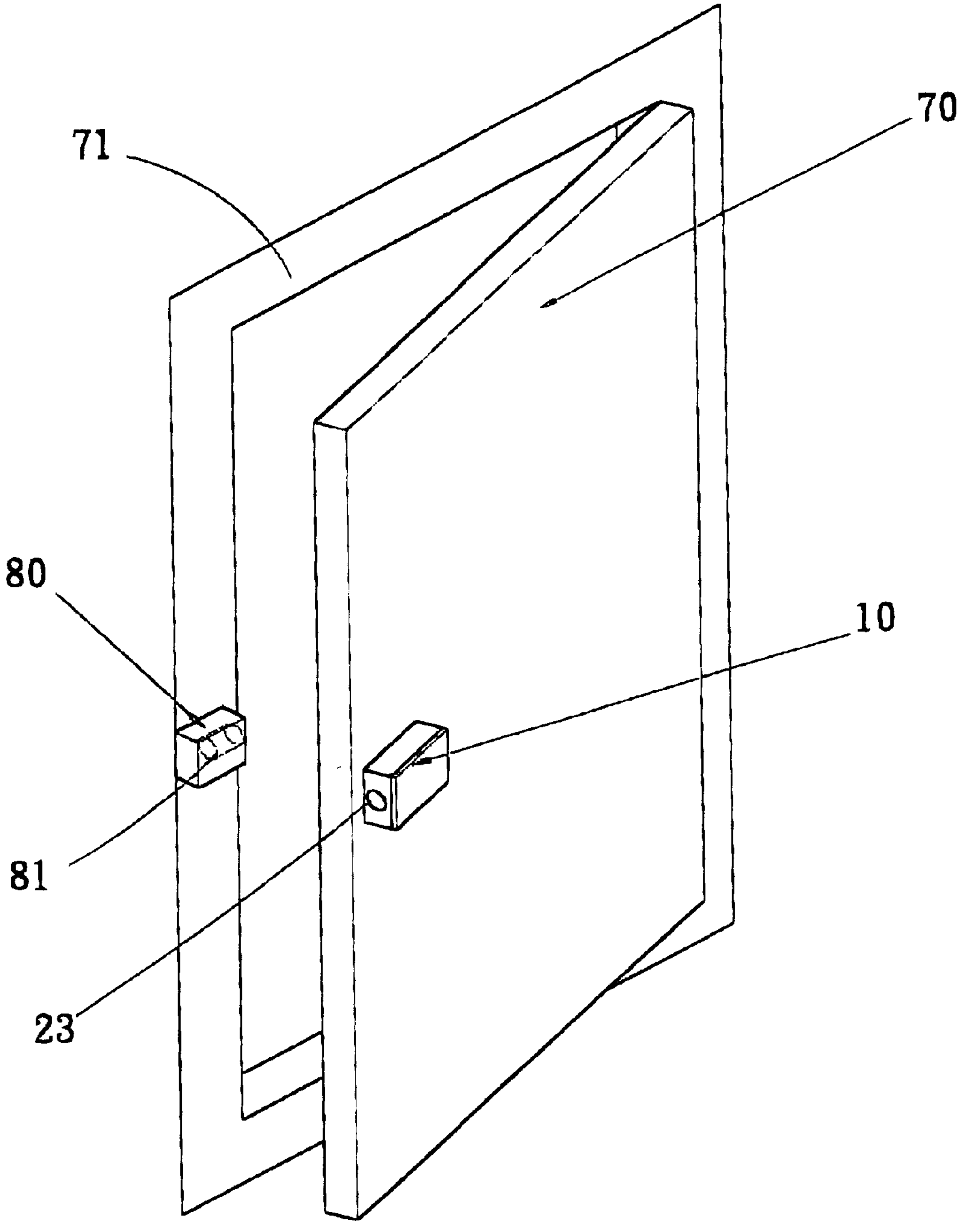
FIG. 5 is a perspective view showing use of the embodiment of the present invention.

Referring to FIGS. 4, 5, the remote control lock 10 of the present invention is fixedly mounted a the door panel 70, and a limiting member 80 is provided on a door frame 71 at a position in corresponding to that of the remote control lock 10, the limiting member 80 has an engaging hole 81. When the electric circuit element 50 of the remote control lock 10 receives a signal, it drives the power motor 44, the power transmission wheel 42 (or the power motor 45 and the power transmission wheel 43), the main gearing wheel 41, the axle rod 36 and the locking rod 33 to make the latching rod 34 extend out of the round hole 23 to engage in the engaging hole 81 of the limiting member 80, or to make the latching rod 34 retract from the engaging hole 81 back into the round hole 23 to get the function of opening and closing the lock.

Wherein when in operation of the remote control lock 10, the electric circuit element 50 can only drive the power motor 44 to rotate, and in turn drives the main gearing wheel 41 of the power transmission wheel 42, the other power motor 45 and the other power transmission wheel 43 are ready for use; the power motor 45 does not run, and the power transmission wheel 43 runs idle. When the power motor 44 faults or is out of work, the electric circuit element 50 drives the other power motor 45 to transmit power through the power transmission wheel 43 (now the other power transmission wheel 42 runs idle) to drive the main gearing wheel 41. In this way, the remote control lock 10 can have two motors for driving; the life of use thereof can be prolonged for one more fold, and thereby can effectively increase the function of the remote control lock 10.

Figure 6:
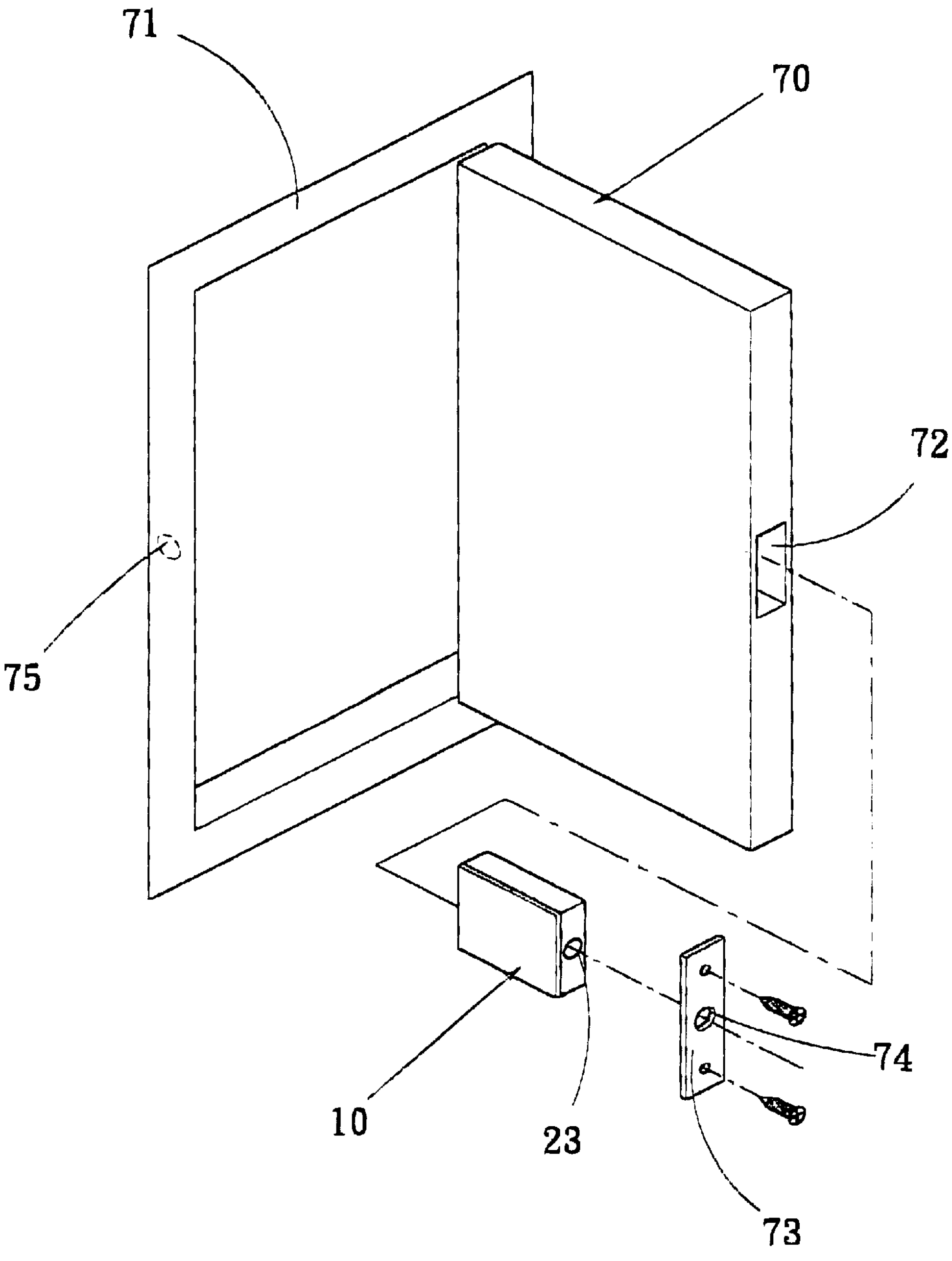
FIG. 6 is a schematic perspective view showing use the remote control lock of the present invention embedded in a door panel.

Referring to FIGS. 4 and 6, the remote control lock 10 of the present invention can be embedded in an engaging hole 72 of the door panel 70, and a fixed plate 73 can be used to cover the remote control lock 10 to fix the latter, so that the remote control lock 10 can be hidden in the door panel 70. The fixed plate 73 is provided with a hole 74 in alignment with the round hole 23 on the remote control lock 10. The door frame 71 is provided at a position in opposition to the round hole 23 with a hole 75, so that when the electric circuit element 50 of the remote control lock 10 receives a signal to drive the power motor 44, the power transmission wheel 42 (or the power motor 45 and the power transmission wheel 43), the main gearing wheel 41, the axle rod 36 and the locking rod 33 to make the latching rod 34 extend out of the round hole 23 to allow the latching rod 34 to be extended into or retracted from the hole 75. Thereby, the object of opening and closing the lock can be achieved. And by virtue that the remote control lock 10 is hidden in the door panel 70, it can not be seen from the outside of the door panel 70, and thereby an excellent theft-proof lock can be obtained.

Referring to FIGS. 4 and 5, the remote control lock 10 of the present invention can be provided in the electric circuit element 50 with a sound-effect horn, in order that when the door panel 70 mounting the remote control lock 10 is destroyed by an external force, the remote control lock 10 can make a sound to fright the thief; or the electric circuit element 50 can be provided with an alarm lamp which is connected to an alarm system, so that the management unit receives the alarm signal can quickly arrest the thief.

In conclusion, by providing the members in the remote control lock of the present invention to extend or retract the latching rod to get the function of opening and closing the lock, and by mounting the remote control lock at a mutual juxtaposed position of the door panel and a door frame to render the remote control lock to be hidden in the door panel to form a concealed lock, thereby to form an excellent theft-proof lock that a thief can not be aware of the true position of the remote control lock, further by mounting a plurality of alarm devices to increase the function of theft-proofing, the present invention meets the requirement for a patent application.

The shape shown in the drawings are only for illustrating a preferred embodiment of the present invention, and not for giving any limitation to the scope of the present invention. It will be apparent to those skilled in this art that various modifications or changes can be made to the elements of the present invention without departing from the spirit, scope and characteristic of this invention, all these shall also fall within the scope of the appended claims. Having now particularly described and ascertained the technical structure of the present invention, what I claim will be declared in the claims followed.

What is claimed is:

1. A remote control lock structure comprising:

a receiving box, a locking member, a transmission mechanism, an electric circuit element and a cover;

wherein said receiving box has therein a receiving space to receive said locking member, said transmission mechanism and said electric circuit element, said receiving space is provided on one end thereof with a round hole, and said receiving box is covered with said cover thereover;

said locking member is provided in said receiving box, and includes a positioning block which has therein a screw hole, said screw hole allows a locking rod to screw therein, said locking rod is provided on one end thereof with an axial hole; said axial hole is provided for extending of an axle rod therein, and said axle rod is provided thereon with a stop block;

said transmission mechanism is connected to one end of said locking member and is provided in said receiving box; said transmission mechanism is provided thereon with a main gearing wheel, two power transmission wheels are provided at the two lateral sides of said main gearing wheel, said two power transmission wheels are provided with two power motors;

said electric circuit element provides electric power for said power motors and is also provided in said receiving box;

said locking member is placed in said receiving space of said receiving box to make alignment of said screw hole of said positioning block with said round hole; said axle rod is connected on one end thereof into said main gearing wheel of said transmission mechanism; said electric circuit element provides electric power to activate one of said power motors, thereby a corresponding one of said two power transmission wheels is driven to rotate, said main gearing wheel and said axle rod thus is in turn driven to rotate, said axle rod further drives said locking rod to rotate in said screw hole, and a latching rod on said locking rod is extended out and retracted in between said screw hole and said round hole.

2. The remote control lock structure as claimed in claim 1, wherein said locking rod of said locking member is driven by said axle rod to rotate forwards and to render said locking rod to extend and move forwards, when a sensing piece of said locking rod is moved to the position in a front sensing device, said electric circuit element activates said one of said power motors to operate; when said locking rod is driven by said axle rod to rotate rearwards and to render said locking rod to move rearwards and retract, said sensing piece of said locking rod is moved to the position in a rear sensing device, now said sensing piece of said locking rod abuts against said stop block of said axle rod, and said electric circuit element stops operation of said power motor.

3. The remote control lock structure as claimed in claim 1, wherein when in operation of said remote control lock, said electric circuit element only drives one of said power motors to rotate, and in turn drives said corresponding one of said two power transmission wheels to drive said main gearing wheel, the other of said power motors and the other of said power transmission wheels are ready for use; when said one of said power motors faults or is out of work, said electric circuit element drives said other power motor to transmit power through said other one of said power transmission wheels to drive said main gearing wheel, in this way, said remote control lock has two motors for driving.

4. The remote control lock structure as claimed in claim 1, wherein said remote control lock is mounted at a mutual juxtaposed position of a door panel and a door frame, so that said remote control lock is hidden in said door panel and is not easy to be destroyed.

5. The remote control lock structure as claimed in claim 1, wherein said receiving box has therein a receiving space which is provided therein with a positioning ring, a recess provided on said axle rod is provided for said positioning ring, when said axle rod is placed in said receiving space, said recess is used to engage said positioning ring, so that said axle rod is pivotally connected to said positioning ring.

6. The remote control lock structure as claimed in claim 5, wherein a positioning seat is provided in the rear of said positioning ring and is provided therein with receiving recesses, said positioning seat is further provided on the front side thereof with a limiting hole; said receiving recesses of said positioning seat are provided for placing therein said power motors of said transmission mechanism, said limiting hole is provided for inserting therein one end of said axle rod.

* * * * *